US007056582B2

(12) United States Patent
Carbo et al.

(10) Patent No.: US 7,056,582 B2
(45) Date of Patent: Jun. 6, 2006

(54) MOLD RESISTANT ACOUSTICAL PANEL

(75) Inventors: Adelaida L. Carbo, Barrington, IL (US); Mark H. Englert, Libertyville, IL (US); Rodney Phillip Musselman, Woodridge, IL (US)

(73) Assignee: USG Interiors, Inc., Chicago, IL (US)

( * ) Notice: Subject to any disclaimer, the term of this patent is extended or adjusted under 35 U.S.C. 154(b) by 317 days.

(21) Appl. No.: 10/417,658

(22) Filed: Apr. 17, 2003

(65) Prior Publication Data

US 2004/0209071 A1 Oct. 21, 2004

(51) Int. Cl.
*B32B 5/66* (2006.01)

(52) U.S. Cl. .................... 428/402; 428/532; 428/537.5; 106/18.33; 106/18.36; 523/122; 427/372.2

(58) Field of Classification Search ................. 428/402, 428/532, 537.5; 106/18.33, 18.36; 523/122; 427/372.2

See application file for complete search history.

(56) References Cited

U.S. PATENT DOCUMENTS

| | | | | |
|---|---|---|---|---|
| 2,432,963 A | | 12/1947 | Camp | |
| 3,159,640 A | | 12/1964 | McClure et al. | |
| 4,655,950 A | | 4/1987 | Michalek | |
| 5,518,774 A | * | 5/1996 | Kappock et al. | 427/384 |
| 5,562,995 A | | 10/1996 | Kappock et al. | |
| 5,883,154 A | | 3/1999 | Kappock et al. | |
| 5,939,203 A | | 8/1999 | Kappock et al. | |
| 6,010,596 A | | 1/2000 | Song | |
| 6,096,122 A | | 8/2000 | Kappock et al. | |
| 6,342,284 B1 | | 1/2002 | Yu et al. | |
| 6,387,172 B1 | | 5/2002 | Yu et al. | |

OTHER PUBLICATIONS

Arch Technical Product Information, "Zinc Omadine®★ Bactericide–Fungicide", Vers. 5, Eff. 7/01.

Arch Technical Product Information, "Zinc Omadine®★ Fungicide—Algicide", Vers. 4, Eff. 4/01.

Arch Technical Product Information, "Zinc Omadine®★ Bactericide–Fungicide 48% Aqueous Dispersion, Fine Particle Size (FPS) Industrial Grade", Vers. 3, Eff. 4/01.

Dr. D. Simpson and J. Irovando, Olin Biocides, "Dry Film Protection for Advanced Adhesive Systems", Adhesives Technology. Jun., 1998.

"Standard Test Method for Resistance to Growth of Mold on the Surface of Interior Coatings in an Environmental Chamber[1]", ASTM Designation: D 3274–94, Oct., 1994.

"Long Term Protection with Fungicide and Algaecide Development", D. Simpson and P. Kappock, PPCJ, Jan., 1986.

Supplemental Labeling, "Sodium Omadine® 40% Aqueous Solution Industrial Microbiostat", Olin Corporation, EPA REG. No. 1258–843, Mar. 13, 1996.

Supplemental Labeling, "Sodium Omadine® 10% Aqueous Solution Industrial Fungicide & Bactericide", EPA REG. No. 1258–1213, Apr. 15, 1997.

* cited by examiner

*Primary Examiner*—Leszek B Kiliman
(74) *Attorney, Agent, or Firm*—Michael M. Geoffrey; David F. Janci; Greer, Burns & Crain, Ltd.

(57) ABSTRACT

A composition for a slurry for manufacture of acoustical panels includes one or more fillers, one or more binders, water and zinc pyrithione. At least of the fillers and/or binders includes microbial nutrients in an amount of at least 1% based on the dry weight of the acoustical panel. In another embodiment of the invention, acoustical panels include a core having a plurality of opposing surfaces and being at least ⅛ inches thick. The core comprises the dried product of a slurry of fillers, binders and water. Zinc pyrithione is present in at least one of the core and a coating applied to at least one of the surfaces of the core.

32 Claims, No Drawings

MOLD RESISTANT ACOUSTICAL PANEL

BACKGROUND

This invention is related to acoustical or ceiling panels. More specifically, this invention relates to acoustical panels that inhibit growth of fungus, bacteria and other microorganisms.

Acoustical tiles, also known as acoustical panels, ceiling tiles or ceiling panels, are well known in the building trades for providing a ceiling that is quickly installed, inexpensive and lightweight. The tiles are prepared from a slurry of fillers and binders, most frequently by either a casting process or a felting process.

In the water felting of such a slurry, a dispersion of a filler, a binder and other ingredients flow onto a moving, porous support, such as that of a Fourdrinier or Oliver mat forming machine for dewatering. The dispersion dewaters first by gravity and then vacuum suction means. The wet basemat is dried in heated convection drying ovens and the dried material is cut to the desired dimensions and optionally top coated, such as with paint, to produce acoustical tiles and panels.

Acoustical tile is also made by a wet pulp molded or cast process such as that described in U.S. Pat. No. 1,769,519. A molding composition that includes fibers, fillers, colorants and a binder is prepared for molding or casting the body of the tile. This mixture is placed upon suitable trays which have been covered with paper or a metallic foil and then the composition is screeded to a desired thickness with a screed bar or roller. A decorative surface, such as elongated fissures, may be provided by the screed bar or roller. The trays filled with the pulp are then placed in an oven to dry or cure the composition. The dried sheets are removed from the trays and may be treated on one or both faces to provide smooth surfaces, to obtain the desired thickness and to prevent warping. The sheets are then cut into tiles of a desired size.

Use of post consumer newspaper and starch-based binders are well known to artisans and have become popular materials in acoustical tile compositions due to their low cost and environmental friendliness. However, starches and cellulosic materials also supply nutrients to growing microbes, such as bacteria, molds, mildew and fungi. As occurs with other building materials, when they become wet or are located in a very humid environment, acoustical tiles are subject to growth of microbes if nutrients are supplied. The use of paper and post consumer materials, such as recycled newspaper, not only adds to the amount of food available for microbes, but also adds to the quantity of bacteria and spores in the wet pulp already provided by airborne spores and microbes and those that may be present in the water.

Attempts have been made to reduce microbe growth by introducing biocides, such as fungicides and bacteriocides, into coatings for acoustical panels. Although some protection against microbe growth is obtained, it is short-lived under severe conditions. More effective biocides would be useful as additives to such coatings. Further, the face of an acoustical panel has openings or fissures to allow sound to be absorbed into the core. Since the coating does not penetrate the entire depth of the openings, surfaces deep in the fissures are exposed to the environment without the benefit of the protective coating unless the biocide is a migrating or leaching type. When the entire panel contains nutrients for microbes, the relatively small amount of biocide in the coating may not be sufficient to protect the larger amount of food available in the core of the panel. There is no evidence in the prior art that biocides from the coating migrate or protect the core material in any way. Even if new microbes are stopped from penetrating the core from the environment by the coating, spores and microbes in the core from the manufacturing process will begin to grow in the nutrient-rich environment if moisture is provided. Thus, coatings that include biocides have not been entirely satisfactory in inhibiting mold growth.

Some biocides are known for use in thin films and as in-can preservatives in coatings such as paints, and are known to protect the wet product and the dried film. Coatings and films that cover the surface of the acoustical panel may reduce microbe growth at the surface, but it is unknown whether the same biocides would be effective throughout the thickness of the acoustical panel. Water-insoluble species would not be expected to migrate into the core from the coating, this would leave the core unprotected.

When used in the core of the building materials, all additives have to maintain their beneficial properties through the process of forming the core. Water-soluble additive materials are likely to be washed away during the dewatering step of a felting process. In cast panels species that are relatively water-insoluble additives may not disperse adequately to be distributed throughout the entire core. Temperatures encountered during drying may be detrimental to the efficacy of the additive.

There is a need for an anti-microbial additive that protects the core of acoustical panels. The additive must be effective in reducing microbial growth after being processed with the acoustical panel and should be useful in either a felting process or a casting process. Even when the core of the panel contains nutrients that support microbial growth, the anti-bacterial additive should maintain its efficacy.

BRIEF DESCRIPTION OF THE INVENTION

These and other objects are met by the present invention that provides anti-microbial resistance to acoustical panels. More specifically, it effectively protects the acoustical panel and even extends protection to the coating when one is present.

A composition for a slurry for manufacture of acoustical panels includes one or more fillers, one or more binders, water and zinc pyrithione. At least one of the fillers and/or binders includes microbial nutrients in an amount of at least 1% based on the dry weight of the acoustical panel. In another embodiment of the invention, acoustical panels include a core having a plurality of opposing surfaces and being at least ⅛ inches thick. The core comprises the dried product of a slurry of fillers, binders and water. Zinc pyrithione is present in at least one of the core and a coating applied to at least one of the surfaces of the core.

The addition of zinc pyrithione in the core of an acoustical panel provides protection to the core of an acoustical panel despite the presence of high concentrations of nutrients that may be present. In basic acoustical panels having inexpensive fillers such as recycled newspaper, the concentration of materials edible to microorganisms can be as high as 75%. Panels having a higher level of nutrients, and the number of microbes that would be attracted to them, benefit by having zinc pyrithione distributed through the core of the panel.

The composition of the present invention protects the core of the panel, a function not guaranteed by anti-microbial coatings. When zinc pyrithione is present throughout the core, all parts of it are protected, even surfaces deep inside fissures, pinholes or other surface openings. The biocide in the core affords protection to the entire panel, even if no coating is used.

Surprisingly, even when coatings with no biocide are used, protection to the panel is provided to a degree that is not explained by mere protection of the fissures. The anti-microbial protection extends to the coating to at least some degree. When the panel is covered with an anti-microbial coating, even greater mold resistance is provided to the panel if zinc pyrithione is added to the panel core.

Further, if the panels are cut to fit an unusual shape, all of the cut surfaces have some protection. The anti-microbial function is not limited to the surface originally coated during manufacture, as when an anti-microbial coating is used. The antimicrobial agent also retains its effectiveness even after going through the manufacturing process in the panel core.

It was also found unexpectedly that when zinc pyrithione was used in coatings applied to the surface of panels, that the efficacy was much greater than other known biocides.

Even more surprisingly, when the preferred biocide, zinc pyrithione, is used, it is not consumed as it acts as an anti-microbial agent, as are other anti-microbial agents. Therefore, long term efficacy is obtainable.

DETAILED DESCRIPTION OF THE INVENTION

The product, method and composition of this invention are intended to apply to panels or tiles commonly referred to as acoustical panels, ceiling tiles and the like. In the following discussion, the invention is referred to as an acoustical panel as one embodiment of the invention. Although most embodiments of the invention have acoustical properties, it is not a requirement of the invention. The panels are useful on walls and in other locations, and are not intended to be limited to use in a ceiling. Unless noted otherwise, compositions are calculated on a weight basis of the dry ingredients.

The primary ingredient in the novel acoustical tile of this invention is one or more fillers. Preferably, at least one of the fillers is a cellulosic fiber, which serves as a bulking agent and provides green strength. The cellulose fiber may also function as a binder to retain fines. Several types of cellulosic fiber have been evaluated in these compositions. It is well known to use newsprint or other post-consumer paper in acoustical tile formulations, and both hammer-milled and hydro-pulped newsprint have been evaluated. Newsprint is preferred for price considerations. Refined paper fibers and wood fiber may also be used as the source of cellulosic fiber, however, it has been found that ceiling tiles made of wood fiber, either softwood or hardwood, are more difficult to cut with a knife at the installation site. Furthermore, wood fibers are a more expensive source of the cellulosic fiber.

When used, cellulosic fibers are present in amounts up to 75% by weight of the dry panel. Preferably, cellulosic fiber makes up less than 30% of the panel by weight. More preferably, the weight of cellulosic fiber is from about 1% to about 30% or from about 12% to about 28%.

Gypsum is another preferred filler in the panels of the present invention. The gypsum source may be calcium sulfate dihydrate, either uncalcined or calcined to hemihydrate and rehydrated. Alternatively, in some embodiments the gypsum source may be calcined gypsum or calcium sulfate anhydrite rehydrated during panel formation to form an interlocking matrix of dihydrate crystals. The calcined gypsum may be co-calcined with the cellulosic fiber material to form a composite material of cellulose fibers interlocked with calcium sulfate crystals. Another source of both gypsum and cellulosic fibers is waste or scrap gypsum wallboard. Panels made by this process are described in more detail in U.S. Pat. No. 5,320,677, herein incorporated by reference. The scrap can be ground and added to the slurry, or it can be feed material for a co-calcining process. There are many advantages of adding gypsum to acoustical panels, including improved surface hardness and fire resistance.

Other fillers are also useful in the composition of this invention. Mineral wool is a commonly used filler in acoustical tiles. Inorganic fillers, such as clays, mica, wollastonite, silica, perlite and calcium carbonate are also suitable. Expanded perlite is particularly useful as a lightweight filler. It is optionally treated to reduce its tendency to retain water, such as treatment with a silicone compound as taught in U.S. Pat. No. 5,964,934, herein incorporated by reference.

Another principle component of the panels is the binder. Although the cellulose fibers may provide sufficient adhesion to function as the sole source of adhesion, it is preferred to also include a secondary binder, such as starch, in the composition. Other binders, such as latex may be used with or without the starch if desired. In some instances, calcium sulfate hemihydrate functions as a binder, forming a matrix of interlocking dihydrate crystals that hold the panel together.

Starch is very cost efficient and is a preferred binder. It is well known to use starch as a binder in acoustical tiles. A starch gel may be prepared by dispersing starch particles in water and heating the starch slurry until the starch is fully cooked and the starch slurry thickens into a viscous gel. A portion of the cellulosic fibers may be incorporated into the starch slurry prior to cooking. The cooking temperature of the starch slurry should be closely monitored to assure full swelling of the starch granules. A representative cooking temperature for cornstarch is about 180° F. (82° C.) to about 195° F. (90° C.). Starch may also be used as a binder without pre-cooking the starch, because it forms a gel during the process of drying the basemat.

A latex binder may be used in place of the starch or the latex may be used in addition to the starch binder. Many of the latex binders useful in acoustical ceiling tile formulations are disclosed in U.S. Pat. No. 5,250,153. It is well known in the art to use thermoplastic binders (latexes) in acoustical tiles based on mineral wool. These latex binders may have a glass transition temperature ranging from about 30° C. to about 110° C. Examples of latex binders include polyvinyl acetate, vinyl acetate/acrylic emulsion, vinylidene chloride, polyvinyl chloride, styrene/acrylic copolymer and carboxylated styrene/butadiene. The ceiling tile of the present invention may be made without starch, calcium sulfate hemihydrate or latex, but preferably at least one of them is present. In the preferred embodiment, the composition includes both starch and cellulosic fibers.

The core of the acoustical panels must have at least 1% of a nutrient for microbes. Panels that have significant amounts of nutrients benefit from the addition of zinc pyrithione to the core. Nutrients are intended to include food or any organic substance, other than water, that will support microbial life forms. Cellulosic fillers and starch binders both provide food for bacteria, molds and fungi. Independently, neither of these materials is required in the present composition, however, the combination of all nutrient sources, including the cellulose, starch and any other nutrients that are present, is at least 1%.

An anti-microbial agent or biocide, such as zinc pyrithione, is also added to either the panel core or to the coatings applied to the panel or both. This ingredient inhibits the growth of molds, mildew, fungi, bacteria and other microbes that can grow on any nutrient-containing substrate in wet or humid conditions. When the pyrithione salt is obtained in a suspension, an emulsion or any liquid form, such as Zinc OMADINE ZOE, the liquid is preferably added to the make up water before the dry ingredients are added. Quantities of a zinc pyrithione additive are calculated based on the dry weight of the zinc pyrithione solids. Pyrithione is known by several names, including 2 mercaptopyridine-N-oxide; 2-pyridinethiol-1-oxide (CAS Registry No. 1121-31-9); 1-hydroxypyridine-2-thione and 1 hydroxy-2(1H)-pyridinethione (CAS Registry No. 1121-30-8). The zinc derivative, known as zinc pyrithione, is one embodiment of this salt that is particularly useful. Pyrithione salts are commercially available from Arch Chemicals, Inc. of Norwalk, Conn., such as Zinc OMADINE or Zinc OMADINE ZOE. Zinc OMADINE ZOE ("ZOE") is an emulsion including 40% zinc pyrithione and 8% zinc oxide and is a preferred source of zinc pyrithione.

Other pyrithione salts may also be found to be useful. Salts having limited solubility in water are most suitable. Zinc OMADINE has a solubility of about 0.0015%. Where solubility is measured on a weight percent basis in water at 77° F. (25° C.) and at pH of 7, pyrithione salts with a solubility below 0.1% and having anti-microbial properties are expected to be suitable for use with the present acoustical panel.

During manufacture of the panels, the zinc pyrithione is added to the slurry of water, fillers and binders that is used to form the panel. It is particularly surprising that the pyrithione salt added to the core protects both the panel core and the coating material. When used in gypsum wallboard, zinc pyrithione shows no migration of the fungicide into the facing paper. Insoluble species would not be expected to move with the water during dewatering or drying processes. There is no reason to suspect zinc pyrithione would be mobile after drying and dewatering is complete and the solid panel is substantially formed. Yet panels of the present invention having zinc pyrithione incorporated only in the core exhibit improved mold resistance to an extent that would not be expected by incorporation of the zinc pyrithione into the core only. Regardless of the actual mechanism, biocides that display this behavior are useful in the acoustical panels of this invention.

The pyrithione salt is added to the gypsum slurry in any effective amount. All concentrations of the pyrithione salt are calculated as the equivalent amount of the zinc derivative and based upon the weight of the dried panel. In one embodiment, at least 100 parts per million zinc pyrithione is used. Preferred zinc pyrithione concentrations include at least 100 ppm, more preferably from about 100 ppm to about 1000 ppm, still more preferably from about 100 ppm to about 700 ppm, even more preferably from about 200 ppm to about 900 ppm and most preferably from about 200 ppm to about 600 ppm.

In most cases, coatings are applied to the surfaces of acoustical panels to impart certain properties to the product. Often, a number of different coatings are used on a single panel to produce a certain combination of properties. In some embodiments, coatings on the front surface of a panel are designed for color, a pleasing look and appearance. Coatings applied to the back surface of the panel are directed less to the appearance and more to sound-modifying properties. Ideally, acoustical panels act as a sound-absorbent to minimize sound from passing through them and into adjacent living spaces and to minimize reflection of sound back into the room or other space in which the panel is installed. Any known coatings are useful on the panels of this embodiment, including zinc pyrithione coatings described in detail below.

An optional ingredient in acoustical panels is clay, which is used to improve fire resistance. When exposed to fire, the clay does not burn, it sinters. The composition optionally includes from about 4% to about 20% clay by weight. Many different types of clay may be used, including Ball Clay from Gleason, Tex.; CTS-1 and CTS-2 from KT Clay of Sledge, Miss., Spinks Clay from Gleason, Tex. and old Hickory Clay from Hickory, Ky. Other commercial clays, such as Bentonite and Kaolin are also useful in acoustical tile formulations. In addition, the acoustical compositions of this invention may also contain other ingredients as are well known in formulations of this type. Lightweight aggregates, surfactants and flocculants are also useful and are well known to an artisan of acoustical tile preparation.

Panels having a plurality of opposed surfaces are made at least ⅛ of an inch thick according to any known method of making acoustical panels. The process begins by mixing a slurry of the filler, binder, zinc pyrithione and water. Ingredients in liquid form are usually mixed with the measured amount of water before the dry ingredients are added. A preferred form of zinc pyrithione is in the form of a dispersion or emulsion. In this form, the insoluble salt is more easily distributed through the slurry, and thus throughout the dried core, since it is less likely to settle or precipitate out of the slurry before the panels are formed. Distribution of the zinc pyrithione through the core is preferable, although this is not meant to imply that the distribution is uniform. Where latex binders are supplied in the form of a liquid emulsion, they are also mixed with the water prior to the addition of the dry ingredients.

Dry ingredients are measured prior to mixing. These ingredients are optionally dry blended prior to addition to the water. After the dry ingredients are added to the water and any liquid ingredients that are mixed therein, the aqueous composition is mixed until a slurry of uniform consistency is achieved. Once formed, the slurry is transferred from the mixing vessel to form the panels.

If a casting process is used, the slurry is transferred to molds of the desired size and shape where the water is either absorbed by one or more of the ingredients or it evaporates. Absorption includes physical absorption such as capillary action, chemical absorption such as hydration, or both. The panel is optionally removed from the mold once a sufficient amount of water has been absorbed or has evaporated that the panel holds together. After removal from the mold, the panel is further dried, preferably by driving off the water in an oven.

Another well-known method of making acoustical panels is by a felting process. The slurry is transferred to a continuous porous belt having sides to form the thickness of the panel. Excess water is removed by dewatering, drawing water through the porous material by gravity, by suction or by application of a press to the wet basemat. Panels then are cut and further dried in an oven.

If desired, openings or depressions are formed on the front side of the panel to absorb sound. The openings are made by scoring, fissuring, pinholing or creating depressions in the basemat by any other means known in the art. Where the panels are cast, the mold could advantageously be shaped to provide the depressions in the cast article. After oven drying, the panels are coated, if desired, with coatings suitable for the particular application for which the panels are intended.

In other embodiments, zinc pyrithione is used in a coating for nutrient-bearing acoustical panels. Compared to other known biocides, zinc pyrithione is unexpectedly effective in retarding the growth of molds and other microbes. Within the recommended EPA limits of 5000 parts per million on the use of biocides in coatings for exterior use, other biocides may not be able to achieve the same level of microbe growth suppression as has been observed with zinc pyrithione.

The zinc pyrithione coating for the surfaces of a nutrient-bearing acoustical panel includes water, a film former and zinc pyrithione. When used in a coating, higher concentrations of zinc pyrithione are generally used than in the core. Zinc pyrithione is used in coatings in concentrations of about 0.04% to about 0.4% based on the total coating weight. Preferably, the concentration ranges from about 0.08% to about 0.4% or from about 0.12% to about 0.2%. Some benefit may be observed in amounts below 0.04%, but the effect is believed to be small below that level. Amounts above 0.4% may also be useful, however, the increase in efficacy may not justify the cost involved.

The film former promotes adhesion between the zinc pyrithione and the surface of the nutrient-bearing substrate. Any film forming substance known for use in coatings is suitable, including both natural and synthetic film formers. Natural film formers include starches, egg proteins, casein and other proteins. Latex polymers, particularly those in the form of an emulsion, are preferred synthetic film formers. Suitable polymers include acrylic polymers, polyvinyl acetate, polyvinyl acrylics, acrylic polymers, ethylene/vinyl chlorides styrene/acrylics and ethylene/vinyl chloride/vinyl acetate terpolymers. Preferred polymers have a glass transition temperature, $T_g$, in the range of from about 10° C. to about 40° C.

Specific examples of suitable film formers include ACRONAL 296 from BASF—North America (Mt. Olive, N.J.), POLYCO 3103 or RHOPLEX 3001 from Rohm & Haas (Philadelphia, Pa.), WALLPOL 40-100 or 40-136 from Reichold Chemical (Durham, N.C.) and AIRFLEX 4530 OR FLEXBOND 325 by Air Products (Allentown, Pa.). This list is intended as examples and is not intended to be limiting. Many other film forming polymers from other sources are suitable for use in the zinc pyrithione coating.

The film former is present in amounts of from about 1% to 30% based on the total weight of the coating. If a flat finish is desired for the panel, the coating preferably includes from about 5% to about 15% film former. Concentrations of film former in the range of from about 20% to about 30% are useful where a high gloss, scrub-resistant finish is desired. Other preferred ranges that give coatings with particular properties are apparent to those skilled in the art of making coatings for such purposes.

A number of useful ingredients are also added to the coatings depending upon the application. Optional ingredients are selected for use in the coatings to impart specific properties to the panels to which the coatings are applied. Pigments, such as titanium dioxide for whiteness are common components and are preferably used in amounts less than 10% by weight of the prepared coating. Clays and other fillers are used in amounts of up to 70% by weight for sound absorbance. Dispersants in amounts up to 1% help keep the dry components in suspension. Thickeners, such as cellulosic thickeners, are used in amounts of up to 10% of the coating weight. Up to 0.5% of a defoamer is used to reduce entrainment of air during mixing. The coating optionally also includes additional biocides, fungicides, bactericides or mildewcides, preferably in amounts less than 2% of the coating weight. Other coating additives will be known to artisans of acoustical panels or their coatings.

These components are all dissolved in water. Amounts of water vary greatly depending on the coating use, but preferably from about 30% to about 70% of the coating weight is water. More preferably, water is from about 30% to about 50% of the coating weight. Coatings that include large amounts of pigments or clays preferably include from about 20% to about 50% water, while coatings designed to carry only the zinc pyrithione preferably have from about 85% to about 98% water by coating weight.

The zinc pyrithione coating is made by methods commonly used by skilled formulators. The ingredients are measured and mixed together to form the coating in a sequence that is determined by the coating composition, the mixing capacity and the preference of the formulator. If the mixing equipment is sufficiently powerful, a homogeneous coating is obtainable regardless of the order in which the components are added.

In a preferred method, a clean tank is used with a dispersing blade. Water is measured and charged to the mixing tank. For proper agitation and dispersion, the tank and batch size should be selected so that the water is charged to a level above the top of the dispersing blades. The mixer is started on a low speed. If a dispersant is used, it is blended into the water prior to addition of the dry ingredients. Generally, the pigments and fillers are added next, while the solution is thin enough to blend them relatively easily. When pigments are used, they should be fully dispersed for maximum coverage and opacity. Components that are easily dispersed in the coating are preferably added last, such as latex emulsions and ZOE dispersions.

Optional components are generally added at any time during the mixing process. Solid materials, such as solid in-can preservatives and biocides are usually added before the fillers. Liquid ingredients are added at any time. When defoamers are added, they are generally added prior to the addition of dry ingredients for optimum effect.

This coating is applied to acoustical panels using any conventional coating technology. The coating is preferably applied to the dried panels at a rate of 20–50 lbs/1000 $ft^2$ (215–538 $g/m^2$). Any coating apparatus, including but not limited to a knife coater, blade coater, spray coater, curtain coater, roll coater, vacuum coaters or rod coaters, are useful for applying the coating. The coating formulation is adaptable to suit the available coating equipment as is known in the art. Preferably, thicker coatings, such as those containing high concentrations of pigments or fillers, are applied with a roll coater. Thinner coatings are preferably sprayed. After the coating is applied, the panel is dried, either at ambient temperature or oven dried. When an oven or kiln is used, the coatings are suitably dried, for example, at 300° to 400° F. (149° C. to 204° C.) for less than five minutes. During drying, the film former creates the coating film over the surface of the panel.

EXAMPLE 1

Samples of acoustical panels were made with the composition shown in Table I. Water was weighed and placed in a mixing bucket. The mineral wool, perlite, paper fiber and starch were added to the water and stirred until a homogeneous mixture was obtained. Zinc OMADINE ZOE dispersion was measured and added to the slurry. The slurry was mixed for 3 minutes at the maximum setting. The flocculent was added and mixed for an additional 15 seconds. The slurry was placed on a nonwoven scrim on a wire in a Tappi box. The box was filled with water to a level that covered the scrim. Slurry was added to the Tappi box. The bottom valve was opened and water was allowed to drain. A press compressed the solids to a predetermined thickness. The time recorded for gravity drainage was recorded. The height of the mat inside the box was also recorded.

A vacuum of 20 inches of Hg was applied for a duration of 5 seconds. The formed mat was transferred to a tared plate. The pressed mat was weighed, then transferred to a 600° F. (316° C.) oven for 30 minutes. The oven temperature was reduced to 300° F., (149° C.), and then the pressed mat was dried for 3 hours at that temperature.

Three layers of coating were applied to the front face of the panel, that is the face that is visible from the living space when the panel is installed. These coatings are primarily for a pleasing appearance. Two coatings were applied to the back face of the panel, primarily to limit sound transmission into adjacent living spaces.

TABLE I

| Composition of Acoustical Panels | |
|---|---|
| Rockwool | 74.5% |
| Perlite | 12.0% |
| Starch | 5.0% |
| Gypsum | 1.5% |
| Latex | 7.0% |

Several sample panels were made by the process described above. Sample 1B was made with the composition of Table I. A second sample, labeled 1A, was made with the same composition, but including 0.105% Zinc OMADINE ZOE, which is equivalent to 0.042% by weight of zinc pyrithione antimicrobial agent. All of the panels were coated with standard coatings having no fungicides, but had 0.08–0.09% tetrahydro-3,5-dimethyl-2H-1,3,5/thiadiazine-2-thione (Metasol D3T by Calgon Corporation) as an in-can preservative.

There is no standard test for the measurement of mold growth on the surface of acoustical panels. As a result, ASTM Standard D3273, herein incorporated by reference, has been adapted and modified as described below for testing of gypsum board and acoustical panels. The procedure was originally developed for testing mold growth on paints and other interior surface coatings. The modified procedure, described below, was used to evaluate the relative resistance of acoustic panels to surface mold fungi and mildew growth in a severe interior environment. Performance of a panel at a certain level in accordance with the Test Method D3273 does not imply any specific period of time that a panel will remain microbe free. However, a better-rated product nearly always performs better in actual end use.

Samples of ½ inch (12.7 mm) thick acoustical panel were measured and cut to three inches by twelve inches. The samples were hung vertically in an environmental chamber three inches above soil that had been impregnated with spores from several specific varieties of mold as specified in the test procedure. Conditions in the chamber are maintained at 90° F. (32.2° C.) and 90% relative humidity for the duration of the test, usually four weeks. Tests were extended if little or no growth was found within four weeks.

At the end of each week, random portions of the sample were studied under a microscope to determine the extent of mold growth on the coated surface of the sample. Areas to be examined were randomly selected to study representative samples, however, this can lead to apparent inconsistencies, such as mold coverage that appears to increase dramatically or suddenly drop from one week to the next on the same sample. After the random surface areas were examined, a value for mold coverage was assigned to each sample as to the fraction of the surface that was covered with mold growth. Each value was estimated to be the nearest 10%. The sample was returned to the environmental chamber at the conclusion of the microscopic analysis.

Results of the modified D3273 testing are shown in Table II below. The numerical values represent the estimated percentage of surface covered by mold averaged over three samples.

TABLE II

| | Surface Mold Coverage | | | |
|---|---|---|---|---|
| | Sample 1A | | Sample 1B (Comparative) | |
| Sample | Front | Back | Front | Back |
| Week 1 | 0 | 0 | 0 | 0 |
| Week 2 | 0 | 0 | 0 | 0 |
| Week 3 | 0 | 2 | 0 | 0 |
| Week 4 | 0 | 2 | 7 | 7 |
| Week 6 | 0 | 0 | 2 | 27 |
| Week 8 | 2 | 2 | 33 | 63 |
| Week 10 | 1 | 8 | 57 | 73 |
| Week 12 | 8 | 37 | 100 | 97 |

The comparative sample, 1B, showed significant mold growth over an 8 week period that resulted in about one third of the front face and two thirds of the back surface being covered by mold. In contrast, where the basemat was protected by the anti-microbial agent of the present invention, mold growth was significantly reduced and was barely detectable over the first eight weeks, and was significantly lower over the entire 12 week test period.

Further, the extent of microbial growth inhibition suggests that the Zinc OMADINE ZOE present in the core provided protection to the coating as well. Coatings were applied to all of these samples, but the coatings contained no mold growth inhibitors. As shown by the control Sample 1B above, growth occurs on the coating under severe conditions such as are present during this test. However, Sample 1A, containing Zinc OMADINE ZOE in the panel core only, has virtually no mold growth. The degree of inhibition of mold growth is not explained solely by additional protection of the exposed core in the fissures of the panel surface. While not wishing to be bound by theory, this suggests that possibly the Zinc OMADINE ZOE is protecting the coating, perhaps by migration from the panel core to the coating. Regardless of the cause, the result is unexpected from materials that are substantially water insoluble such as zinc pyrithione and zinc oxide.

EXAMPLE 2

Test panels containing a high concentration of nutrients were made and tested using the procedures described in Example 1. The base composition of the acoustical panels is shown in Table III.

TABLE III

| Base Composition For High Nutrient Panels | |
|---|---|
| Ingredient | Concentration |
| Mineral Wool | 38% |
| Perlite | 35% |
| Recycled Newspaper | 12% |
| Clay | 4% |
| Starch | 11% |

The base composition of Table III shows that the base formulation includes both starch and paper, making it relatively high in nutrients to support microbe growth. Panels were made with varying concentrations of Zinc OMADINE ZOE Dispersion (Arch Chemicals, Norwalk, Conn.). The test panels included either no biocide, 0.025% or 0.05% zinc pyrithione. Coatings normally used on this type of panel were applied to both the control and test panels. Samples of the panels were tested as described in Example 1.

TABLE IV

| High Nutrient Acoustic Panels | | | | | | |
|---|---|---|---|---|---|---|
| | No Biocide | | 0.025% ZOE | | 0.05% ZOE | |
| Time | Front | Back | Front | Back | Front | Back |
| 1 Week | 7 | 14 | 2 | 0 | 2 | 2 |
| 2 Weeks | 53 | 70 | 37 | 40 | 30 | 30 |
| 3 Weeks | 47 | 80 | 43 | 57 | 20 | 33 |
| 4 Weeks | 43 | 60 | 47 | 47 | 27 | 47 |

Compared to the samples of Example 1, larger fractions of the surface were covered with mold in all samples due to the high concentration of nutrients available. However, increasing the concentration of zinc pyrithione in the core of the panels provides increased resistance to mold growth. Improvement is seen in the samples with each increase in zinc pyrithione concentration in the core.

This data also demonstrates that zinc pyrithione addition to the core improves mold resistance with a variety of different panel coatings. The composition of the coatings used on the front and the back of the samples are very different from each other, yet the core zinc pyrithione additions provided protection in both cases.

Even when biocides were included in the coating of high nutrient-containing panels, additional resistance to mold growth was provided by the addition of zinc pyrithione in the panel core.

EXAMPLE 3

Additional samples of high-nutrient panels were prepared from the base composition shown in Table III. Two sets of samples were prepared with no biocides added to any of the base panel samples. The samples were covered with coatings that differed only in the type of biocide used. Coatings formulated with METASOL TK-100 (Calcon Corp., Naperville, Ill.) were applied to one set of samples. The METASOL TK-100 was replaced with an equal amount of zinc pyrithione in the second set of samples. Both sets of samples were tested by the procedure set forth in Example 1.

TABLE V

| Comparison of TK-100 And ZOE Coatings | | | | |
|---|---|---|---|---|
| | TK-100 Coatings | | ZOE Coatings | |
| | Front | Back | Front | Back |
| Week 1 | 4 | 14 | 0 | 0 |
| Week 2 | 53 | 70 | 0 | 0 |
| Week 3 | 47 | 80 | 2 | 1 |

These tests demonstrate the outstanding ability of ZOE to prevent mold growth compared to METASOL TK-100.

EXAMPLE 4

A commercially available acoustical panel having a mold resistant coating was tested under the same conditions as described in Example 1. Composition of samples of Classic Fine Fissured Panels with Bioblock (Armstrong World Industries, Lancaster, Pa.) is not known. However, test results are shown here as a comparison of the ZOE used in the present invention compared to a well-known, commercially available product for the same purpose.

TABLE VI

| ARMSTRONG TILES WITH BIOBLOCK TEST RESULTS | | |
|---|---|---|
| | Front | Back |
| Week 1 | 10 | 0 |
| Week 2 | 90 | 23 |
| Week 3 | 90 | 60 |
| Week 4 | 40 | 97 |

Gross visual inspection of the tiles showed that the tiles were virtually engulfed in mold and the trial was stopped after four weeks. Selection of random areas for study of mold growth may have underestimated the mold coverage at the fourth week on the front of the samples. However, even if this datum is given full weight, this sample did not inhibit mold growth as well as either of the samples in Example 3.

Even though the product of Example 4 probably differed from the samples of Example 3 in core composition and coating compositions, the performance of the zinc pyrithione coatings compared to the mold-resistant coatings of this commercial product are surprising. After three weeks, approximately three-quarters of the surface of the commercial product in Example 4 was covered by mold, while under the same conditions, the zinc pyrithione coatings in Example 3 showed no significant mold growth.

EXAMPLE 5

Test panels made according to the method of Example 1 were prepared having the composition shown in Table 1. Coatings having compositions shown in Table VII were prepared by charging water into the tank and starting the mixer. The dispersant, thickener, defoamer and biocides were added, one at a time, while mixing. Mixer speed was increased, then pigment, clays, and other solid ingredients used as fillers were added. After mixing at least 15 tminutes at high speed, the mix was checked for lumps or large aggregates. The composition was mixed until well dispersed, then checked for physical properties such as viscosity, pH, percent solids and weight per gallon.

All of the amounts reported in the table are percentages based on the total coating weight.

TABLE VII

| Coating Compositions | | | | |
|---|---|---|---|---|
| Ingredient | Coating 1A | Coating 1B | Coating 2A | Coating 2B |
| Water | 41.07 | 40.99 | 41.63 | 41.56 |
| Thickeners | 0.55 | 0.55 | 0 | 0 |
| Preservatives | 0.09 | 0.09 | 0.09 | 0.09 |
| Pigments | 23.86 | 23.81 | 3.95 | 3.95 |
| Dispersants | 0.42 | 0.42 | 0 | 0 |
| Defoamers | 0.13 | 0.13 | 0.09 | 0.09 |
| Clay Type | Calcined | Calcined | Delaminated | Delaminated |
| Clays | 26.80 | 26.74 | 48.77 | 48.69 |
| Latex | 6.79 | 6.78 | 0 | 0 |
| TK-100 | 0.29 | 0 | 0.32 | 0 |
| Zinc pyrithione | 0 | 0.20 | 0 | 0.20 |

The coatings having "B" identifiers are the same as the coatings with the "A" identifiers, except that the TK-100 was removed and a suspension of zinc pyrithione and zinc oxide was used in its place. Zinc OMADINE ZOE by Arch Chemicals was the source of zinc pyrithione. Coatings 1A and 1B were used on the front side of their respective samples, while coatings 2A and 2B were applied to the back.

On the front panel surfaces, the coatings were applied at the rate of 16±2 grams per square foot, while coatings applied to the back surfaces had a coating weight of 20±2 grams per square foot. Tests of these coatings as described in Example 1 on the standard basemat are shown in Table VIII below:

TABLE VIII

Effect Of Coatings On Standard Basemat

| | Side/Coating | | | |
|---|---|---|---|---|
| | TK-100 Coatings | | ZOE Coatings | |
| | Front/1A | Back/2A | Front/1B | Back/2B |
| Week 1 | 0 | 0 | 0 | 0 |
| Week 2 | 0 | 0 | 0 | 0 |
| Week 3 | 1 | 0 | 0 | 1 |
| Week 4 | 5 | 0 | 0 | 1 |
| Week 6 | 10 | 0 | 0 | 0 |
| Week 8 | 67 | 30 | 3 | 1 |
| Week 10 | 80 | 67 | 1 | 2 |
| Week 12 | 100 | 90 | 5 | 2 |

These tests demonstrate the unexpected efficacy of zinc pyrithione when used in a coating on a nutrient-bearing basemat. Compared to another biocide, zinc pyrithione provides a much higher level of protection over the entire duration of the test. The results also demonstrate the use of zinc pyrithione in different types of coatings, such as those that might be useful on the front or back surface of acoustical panels.

EXAMPLE 6

Test panels having the same composition as in Example 1 were prepared according to the method of Example 1. All panels were covered with coatings that included 0.5% Zinc OMADINE ZOE. Results of the modified D3273 testing are shown in Table IX below.

TABLE IX

Zinc Pyrithione Addition to Both Core and Coating

| | No Biocide in core | | 0.025% zinc pyrithione in core | | 0.05% zinc pyrithione in core | |
|---|---|---|---|---|---|---|
| Surface | Front | Back | Front | Back | Front | Back |
| Week 1 | 0 | 0 | 0 | 0 | 0 | 0 |
| Week 2 | 0 | 0 | 0 | 2 | 1 | 0 |
| Week 3 | 2 | 1 | 12 | 1 | 2 | 2 |
| Week 4 | 17 | 17 | 20 | 7 | 13 | 8 |

The fronts of all test panels were covered with the same coatings all having 0.5% zinc pyrithione. Similarly, the backs of all test panels were covered with the same coatings having the same concentration of zinc pyrithione as the front coatings. Even though all surfaces were coated with an anti-microbial coating, the effects of varying the zinc pyrithione in the core of the panel are evident.

While particular embodiments of the mold resistant acoustical panel of the present invention have been shown and described, it will be appreciated by those skilled in the art that changes and modifications may be made thereto without departing from the invention in its broader aspects and as set forth in the following claims.

What is claimed is:

1. A composition for a slurry for manufacture of an acoustical panel comprising one or more fillers, one or more binders, water and zinc pyrithione, wherein at least one of said fillers and binders comprise microbial nutrients in an amount of at least 1% based on the dry weight of the acoustical panel.

2. The composition of claim 1 wherein said microbial nutrients comprise at least one of starch and paper.

3. The composition of claim 2, wherein said paper comprises post-consumer waste paper.

4. A mold-resistant acoustical panel comprising:

a core having a plurality of opposed surfaces, said core comprising the dried product of a slurry comprising water, one or more fillers and one or more binders, said core having a thickness of at least ⅛ inch and wherein at least one of said fillers and binders comprises one or more microbial nutrients in an amount of at least 1% by weight of the acoustical panel; and, zinc pyrithione distributed through said core.

5. The acoustical panel of claim 4 wherein said zinc pyrithione is present in amounts of at least 100 parts per million on a weight basis.

6. The acoustical panel of claim 5 wherein said zinc pyrithione is present in amounts of from about 100 parts per million to about 1000 parts per million on a weight basis.

7. The acoustical panel of claim 4 further comprising zinc oxide.

8. The acoustical panel of claim 4 wherein said microbial nutrient comprises at least one of wood fibers, cellulose, starch and paper.

9. The acoustical panel of claim 8 wherein said paper comprises post-consumer waste paper.

10. The acoustical panel of claim 4 wherein said core comprises at least 2% by weight of said microbial nutrient.

11. The acoustical panel of claim 10 wherein said core comprises at least 10% by weight of said microbial nutrient.

12. The acoustical panel of claim 4 wherein said slurry further comprises at least one of calcium sulfate dihydrate or calcium sulfate hemihydrate.

13. The acoustical panel of claim 4 wherein at least a portion of said water has been drained from said slurry to form said core.

14. The acoustical panel of claim 4 wherein a coating is applied to at least one of said surfaces.

15. The acoustical panel of claim 14 wherein said coating comprises a second anti-microbial agent.

16. The acoustical panel of claim 15 wherein said second anti-microbial agent comprises a pyrithione salt.

17. The acoustical panel of claim 16 wherein said microbial nutrients comprise at least one of starch and paper.

18. An acoustical panel comprising:

a core having a plurality of opposed surfaces, said core comprising the dried product of a slurry comprising one or more fillers, one or more binders and water, said core being at least ⅛ of an inch thick and wherein at least one of said fillers and binders comprise microbial nutrients in an amount of at least 1% based on the dry weight of the acoustical panel; and a pyrithione salt having a solubility in water of less than 0.1% and being distributed through said core.

19. A mold-resistant acoustical panel comprising:

a core having a plurality of opposed surfaces, said core comprising the dried product of a slurry comprising water, one or more fillers and one or more binders, said core having a thickness of at least ⅛ inch and wherein at least one of said fillers and binders comprises one or more microbial nutrients in an amount of at least 1% by weight of the acoustical panel; and, a coating comprising zinc pyrithione, wherein said coating is applied to at least one of said surfaces.

20. The mold-resistant acoustical panel of claim 19 wherein said zinc pyrithione is present in amounts from about 0.1% to about 1% based on the total coating weight.

21. The mold-resistant acoustical panel of claim 20 wherein said zinc pyrithione is present in amounts from about 0.2% to about 0.8% based on the total coating weight.

22. The mold-resistant acoustical panel of claim 19 wherein said nutrients are present in amounts of at least 2%.

23. The mold-resistant acoustical panel of claim 19 wherein said coating further comprises a film former.

24. The mold-resistant acoustical panel of claim 19 further comprising at least one of a group consisting of thickeners, defoamers, pigments, dispersants and preservatives.

25. A coating composition to be applied to an acoustical panel, said panel comprising at least 1% microbiological nutrients, said composition comprising water, a film former and from about 0.01% to about 1% zinc pyrithione.

26. A mold-resistant acoustical panel comprising:

a core having a plurality of opposed surfaces, said core comprising the dried product of a slurry comprising water, one or more fillers and one or more binders, said core having a thickness of at least ⅛ inch and wherein at least one of said fillers and binders comprises one or more microbial nutrients in an amount of at least 1% by weight of the acoustical panel; and, zinc pyrithione distributed through at least one of said core and a coating applied to at least one of said surfaces.

27. A method of making an acoustical panel comprising:

mixing a slurry comprising one or more fillers, one or more binders, zinc pyrithione and water, at least one of said fillers and binders comprising microbial nutrients in the amount of at least 1% by weight of the dry product;

forming a panel; and drying the panel.

28. The method of claim 27 further comprising coating said panel after drying.

29. The method of claim 27 wherein said forming step comprises casting the slurry into a mold.

30. The method of claim 27 wherein said forming step comprises pouring said slurry on a porous support to form a wet basemat and dewatering the basemat.

31. The method of claim 30 wherein said dewatering step comprises applying suction to the basemat.

32. The method of claim 27 wherein said mixing step includes distributing the zinc pyrithione throughout the slurry.

* * * * *